United States Patent [19]

Nakamura

[11] Patent Number: 5,797,040
[45] Date of Patent: Aug. 18, 1998

[54] COMPUTER SYSTEM HAVING SYSTEM BUS WHICH COUPLES ADAPTER AND PROCESSING UNITS AND REQUIRES ACQUISITION FOR DATA TRANSMISSION THEREOVER

[75] Inventor: Yoichi Nakamura, Kawasaki, Japan

[73] Assignee: Fujitsu Limited, Kanagawa, Japan

[21] Appl. No.: 599,118

[22] Filed: Feb. 9, 1996

Related U.S. Application Data

[63] Continuation of Ser. No. 216,026, Mar. 22, 1994, abandoned.

[30] Foreign Application Priority Data

May 19, 1993 [JP] Japan ................................. 5-117271

[51] Int. Cl.⁶ .................................................. G06F 13/362
[52] U.S. Cl. .................................................. 395/872
[58] Field of Search ........................ 395/873, 250, 395/872

[56] References Cited

U.S. PATENT DOCUMENTS

| | | | |
|---|---|---|---|
| 4,332,026 | 5/1982 | Alvarez et al. | 370/347 |
| 4,965,801 | 10/1990 | DuLac | 371/40.1 |
| 5,109,520 | 4/1992 | Knierim | 395/800 |
| 5,127,088 | 6/1992 | Takaki | 395/439 |
| 5,130,981 | 7/1992 | Murphy | 370/401 |
| 5,175,732 | 12/1992 | Hendel et al. | 370/463 |
| 5,404,452 | 4/1995 | Detschel et al. | 395/250 |
| 5,526,507 | 6/1996 | Hill | 395/441 |

*Primary Examiner*—William M. Treat
*Assistant Examiner*—Kenneth R. Coulter
*Attorney, Agent, or Firm*—Staas & Halsey

[57] ABSTRACT

A data transmission system is provided in a computer system including at least one processing unit for processing data and at least one adapter for controlling a device coupled thereto, the processing unit and the adapter being coupled to each other by a bus, in which after information is forwarded to the bus from the processing unit or the adapter which has acquired use of the bus, the bus is released from the processing unit or the adapter. The data transmission system includes a plurality of buffers, provided in the adapter, for storing data to be transmitted to the processing unit, and a plurality of buffer control sequencers each of which are coupled to one of the plurality of buffers, each of the plurality of buffer control sequencers controlling transmission of data stored in a corresponding one of the plurality of buffers when use of the bus is granted to the relevant one of the plurality of buffer control sequencers in response to a request for permission to transmit data.

4 Claims, 7 Drawing Sheets

| BIT 1 2 3 | | SEQUENCER DEFINITION |
|---|---|---|
| 0 0 0 | 0 | IDLE STATE |
| 0 0 1 | 1 | WAITING PERMISSION OF TRANSMISSION |
| 0 1 0 | 2 | TRANSMISSION OF DATA |
| 0 1 1 | 3 | WAITING RESULT OF TRANSMISSION |
| 1 0 0 | E | TERMINATION OF TRANSMISSION |

FIG.5

| BIT 1 2 3 | | SEQUENCER DEFINITION |
|---|---|---|
| 0 0 0 | 0 | IDLE STATE |
| 0 0 1 | 1 | TERMINATION OF TRANSMISSION (BUFFER X) |
| 0 1 0 | 2 | TERMINATION OF TRANSMISSION (BUFFER X) |
| 0 1 1 | 3 | TERMINATION OF TRANSMISSION (BUFFER X) |
| 1 0 0 | E | TERMINATION OF ONE TRANSMISSION OPERATION CYCLE |

COMPUTER SYSTEM HAVING SYSTEM BUS WHICH COUPLES ADAPTER AND PROCESSING UNITS AND REQUIRES ACQUISITION FOR DATA TRANSMISSION THEREOVER

This application is a continuation of application Ser. No. 08/216,026, filed Mar. 22, 1994, now abandoned.

BACKGROUND OF THE INVENTION

(1) Field of the Invention

The present invention generally relates to a data transmission system in a computer system and, more particularly, to a data transmission system in a computer system having a processing unit (CPU), and an adapter coupled to each other by a system bus, the adapter controlling various devices in accordance with instructions from the processing unit.

(2) Description of the Related Art

In a conventional computer system having at least one processing unit (hereinafter referred to as a CPU) in which software runs and at least one adapter for controlling a device, such as a hard disk unit, a communication line or the like, a bus coupling the CPU and the adapter is controlled in accordance with a so-called split method. In a bus operation executed when the CPU supplies instructions to the adapter, although the bus is generally interlocked with the CPU until the CPU receives a response to the instructions, in accordance with the split method, the bus is released from the CPU immediately after the CPU transmits the instructions. Thus, in the case of the split method, other CPUs and other adapters can use the bus until results in response to the instructions from the CPU are obtained by the adapter. In this computer system, when a large amount of data is transmitted from the adapter to the CPU in accordance with the instructions from the CPU, the adapter stores the data read out from a device temporarily in a buffer in a system bus controller provided in the adapter, and then the data stored in the buffer is transmitted to the CPU.

In the conventional data transmission system operated in accordance with the split method, after the transmission of the data from the system bus controller to the CPU is completed, the next data cannot be transmitted from the adapter until the adapter receives, from the CPU, a message indicating that the previous data has been normally received. Thus, even if the rate of the bus clock signal increases or the number of buffers in the adapter increases, the transmission rate of the data in the data transmission system has a limit. In addition, when the CPU is in a busy state in which the CPU is operating so that data cannot be received, the adapter from which data is to be transmitted to the CPU retries the transmission of data at predetermined intervals. Thus, in this case, the transmission rate of the data deteriorates.

SUMMARY OF THE INVENTION

Accordingly, a general object of the present invention is to provide a novel and useful data transmission system in which the disadvantages of the aforementioned prior art are eliminated.

A more specific object of the present invention is to provide a data transmission system in which the system bus is efficiently used to transmit data between a CPU and an adapter in a computer system so that the transmission rate of the data is improved.

The above objects of the present invention are achieved by a data transmission system in a computer system including at least one processing unit for processing data and at least one adapter for controlling a device coupled thereto, the processing unit and the adapter being coupled to each other by a bus, in which after information is forwarded to the bus from the processing unit or the adapter which has acquired use of the bus, the bus is released from the processing unit or the adapter, the data transmission system comprising: a plurality of buffers, provided in the adapter, for storing data to be transmitted to the processing unit; and a plurality of buffer control means each of which is coupled to one of the plurality of buffers, each of the plurality of buffer control means controlling transmission of data stored in a corresponding one of the plurality of buffers when use of the bus is granted to the buffer control means in response to a request of permission to transmit data.

The above objects of the present invention are also achieved by a data transmission system having the above structure and further comprising master control means for supervising the plurality of buffer control means so that until the data stored in all of the plurality of the buffers is completely transmitted to the processing unit, each of the plurality of buffer control means is prohibited from starting the transmission of data in a next cycle in which new data stored in the plurality of buffers is to be transmitted.

According to the present invention, each of the plurality of buffer control means in the adapter can separately use the bus, so that the bus can be efficiently used to transmit data from the adapter to the processing unit. In addition, until the data stored in all of the buffers is completely transmitted to the processing unit, each of the plurality of buffer control means is prohibited from starting the transmission of data in the next cycle. In this system, even if the transmission of data controlled by one of the plurality of buffer control means is not completed, other buffer control means can control the transmission of data without waiting one cycle. Thus, the system bus is efficiently used to transmit the data stored in the plurality of buffers.

Additional objects, features and advantages of the present invention will become apparent from the following detailed description when read in conjunction with the accompanying drawings.

DESCRIPTION OF THE PREFERRED EMBODIMENTS

A description will now be given of an embodiment of the present invention.

Figure 1:
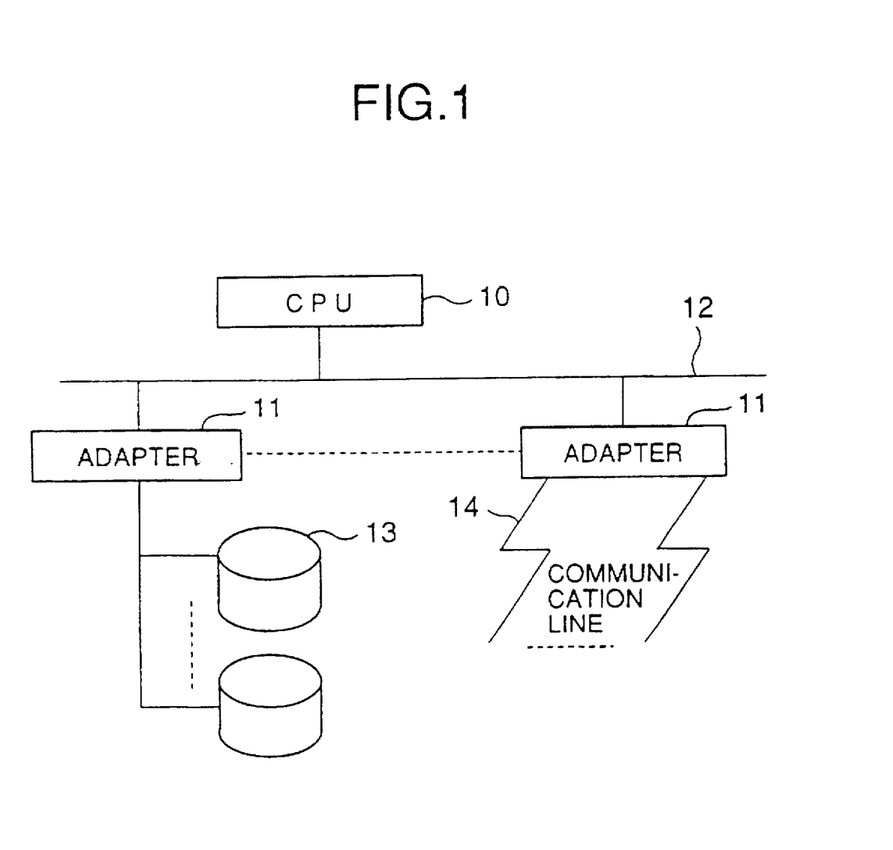
FIG. 1 is a block diagram illustrating a computer system to which a data transmission system according to an embodiment of the present invention is applied.

A computer system to which a data transmission system according to an embodiment of the present invention is applied is formed as shown in FIG. 1. Referring to FIG. 1, the computer system has a CPU (a processing unit) 10 and a plurality of adapters 11, all of which are coupled to each other by a system bus 12. The computer system may be provided with other CPUs coupled to the system bus. The CPU 10 has a memory in which an operating system (OS) is stored and a micro-processor operating in accordance with the operating system (OS) stored in the memory. The adapters 11 control a disk unit 13, a communication line 14 and other devices. Bus operations of the system bus 12 coupling the CPU 10 and the adapters 11 are controlled in accordance with the split method described above. The CPU 10 issues instructions to the adapters 11 in accordance with instructions from the operating system (OS). The adapters 11 execute operations in accordance with the instructions from the CPU, such as operations in which data is read out from the disk unit 13 and data is written to the disk unit 13.

Figure 2:
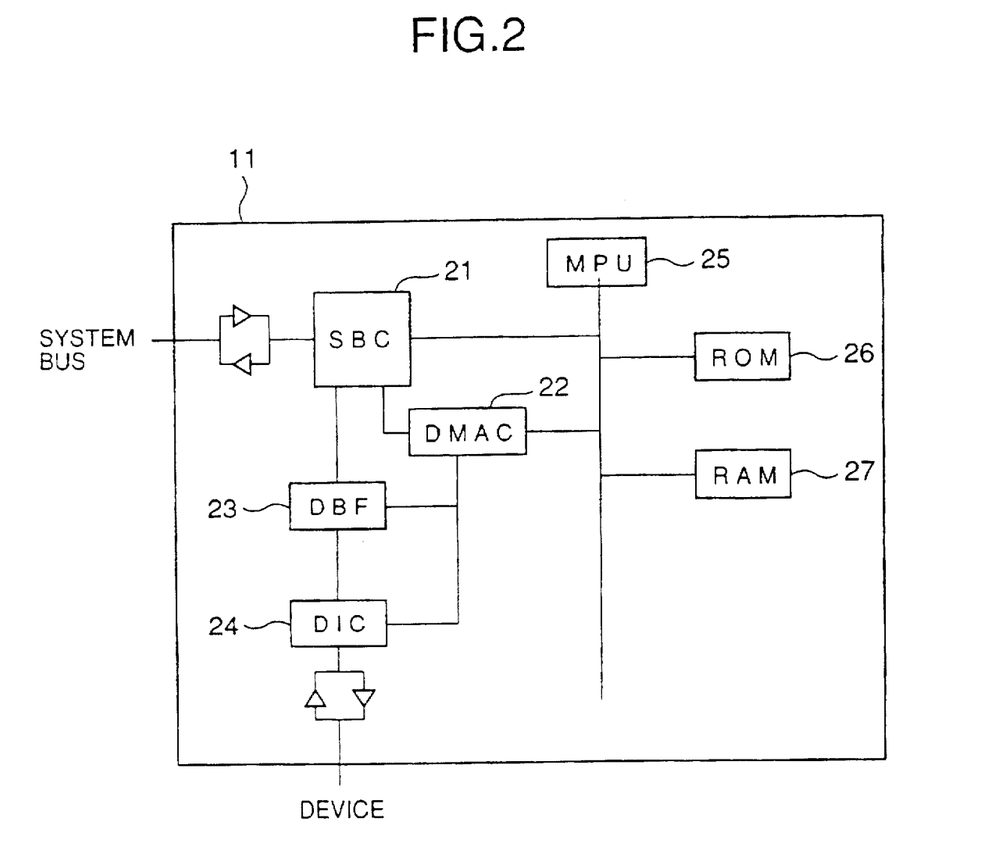
FIG. 2 is a block diagram illustrating an adapter provided in the computer system shown in FIG. 1.

Each of the adapters 11 is formed as shown in FIG. 2. Referring to FIG. 2, each of the adapters 11 has a system bus controller (SBC) 21, a DMA controller (DMAC) 22, a data buffer (DBF) 23, a device interface controller (DIC) 24, a micro-processor (MPU) 25, a ROM 26 and a RAM 27. In an adapter 11, the SBC 21 controls the system bus coupled to the CPU 10. The DMAC 22 controls the DMA transmission of data to a device connected to the adapter 11. The DBF 23 is used to temporarily store data in the DMA transmission. The DIC 24 controls interfacing operation with respect to the device such as the disk unit 13, the communication line or the like. The MPU 25 controls various operations in the adapter 11. The ROM 26 is provided with programs in accordance with which the MPU 25 operates. The RAM 27 is used as a working area in which data processing is performed.

When a power supply is turned on, the programs are transferred from the ROM 26 to the RAM 27 so that the adapter 11 starts initial operations. After various parts of the hardware are initialized, the programs check operation states of functions of the hardware, and the processing state of the programs is then changed to a waiting state. Instructions issued by the CPU 10 are received by the SBC 21 of the adapter 11, and the instructions are supplied from the SBC 21 to the MPU 25. The MPU 25 analyzes the instructions and controls the respective units in the adapter 11 to execute the instructions. If an instruction to read out data from predetermined addresses of the disk unit 13 is, for example, issued to the adapter 11 by the CPU 10, the MPU 25 supplies to the DIC 24 an instruction to read out the data from the predetermined address of the disk unit 13. After the preparation of the data transmission in the disk unit 13 is completed, the DIC 24 informs the MPU 25 that the preparation of the data transmission in the disk unit 13 has been completed. The MPU 25 controls the DMAC 22 so that data supplied from the disk unit 13 is stored in the DBF 23. When a given amount of data has been stored in the DBF 23, the DMAC 22 starts to transmit the data to the SBC 21. When internal buffers are filled with the data, the SBC 21 requests the use of the system bus 12. When the SBC 21 acquires the use of the system bus 12, the data is transmitted from the adapter 11 to the CPU 10 via the system bus 12. When the CPU 10 has normally received the data from the adapter 11, the CPU 10 informs the adapter 11 that the CPU 10 has thus normally received the data.

Figure 3:
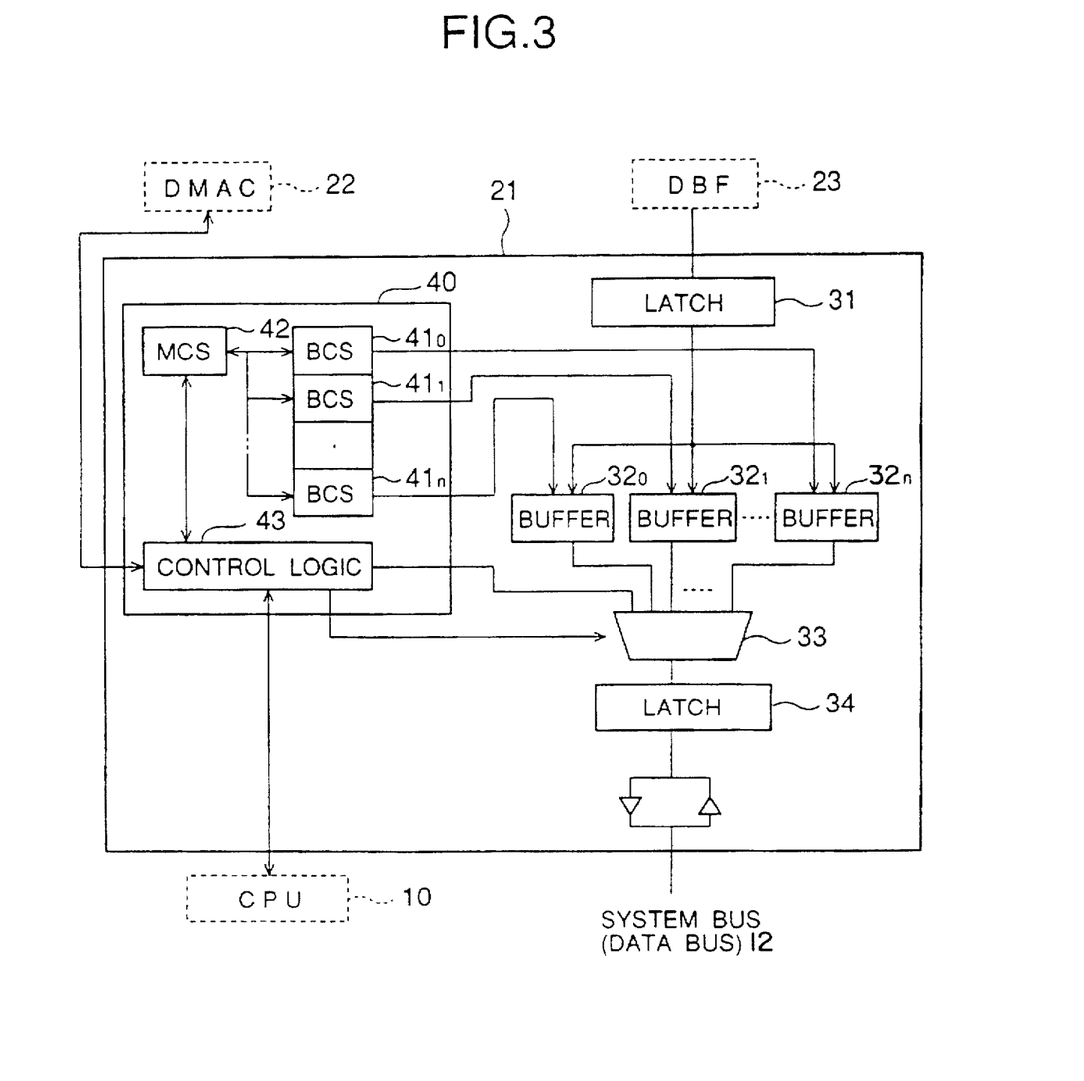
FIG. 3 is a block diagram illustrating a system bus controller (SBC) provided in the adapter shown in FIG. 2.

A DMA control portion of the SBC 21 is shown in FIG. 3. Referring to FIG. 3, the SBC 21 has a latching circuit 31, a plurality of buffers $32_0$–$32_n$, a selector 33, a latch circuit 34 and a controller 40. The data supplied from the DBF 23 is temporarily latched by the latch circuit 31. The data latched by the latching circuit 31 is supplied to and stored in one of the buffers $32_0$–$32_n$. One of the buffers $32_0$–$32_n$ is selected by the selector 33 so that the data is supplied from the selected buffer to the latch circuit 34. The latching circuit 34 temporarily latches the data supplied from the selector 33. The data latched by the latch circuit 34 is supplied to the system bus 12.

The controller 40 has buffer control sequencers (BCS) $41_0$–$41_n$, a master control sequencer (MCS) 42 and a control logic circuit 43. Each of the BCSs $41_0$–$41_n$ is coupled to a corresponding one of the buffers $32_0$–$32_n$ so as to control the respective coupled buffer. The MCS 42 supervises all the BCSs $41_0$–$41_n$. The control logic circuit 43 controls the BCSs $41_0$–$41_n$ and the MCS 42 in accordance with instructions from the DMAC 22. The control logic circuit 43 also controls the selector 33.

Figure 4:
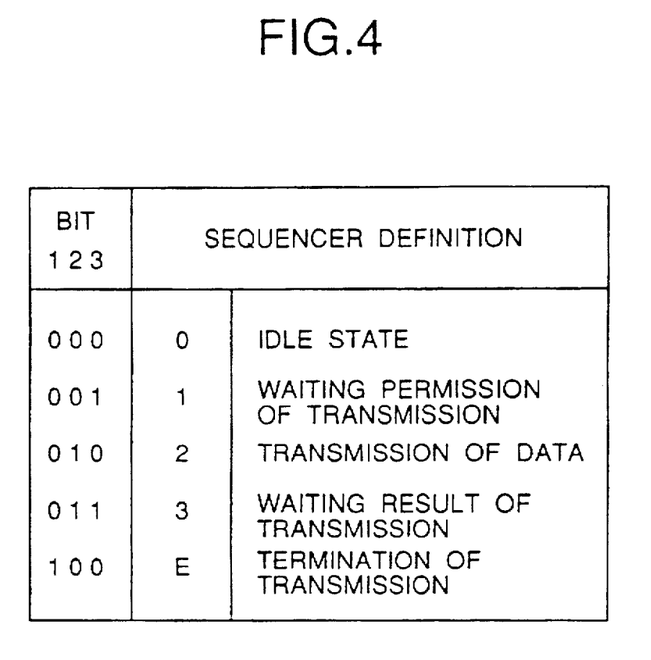
FIG. 4 is a diagram illustrating definitions of operation states of the system bus controller (SBC).

Each of the BCSs $41_0$–$41_n$ defines operation states each of which is identified by 3 bits as shown in FIG. 4. That is, the operation states, in a case where data is supplied from the adapter 11 to the CPU 10 via the system bus 12, are defined by each of the BCSs $41_0$–$41_n$.

Referring to FIG. 4, a state "0" identified by bits (000) is an idle state where there is no operation in the hardware.

A state "1" identified by bits (001) is a permission waiting state where the corresponding buffer is filled with the data supplied from the DBF 23 and the adapter 11 is waiting to obtain permission to transmit the data to the CPU 10. In the state "1", the data transmission starts as soon as the system bus 12 is released.

A state "2" identified by bits (010) is a state where the data is being transmitted to the CPU 10 based on the permission to transmit the data.

A state "3" identified by bits (011) is a state where the data transmission is terminated and the adapter 11 is waiting to obtain the transmission result from the CPU 10.

A state "E" identified by bits (100) is a state where the data transmission operation is completed.

The BCSs $41_0$–$41_n$ respectively enter operation states independently, so that the transmission processes using the buffers $32_0$–$32_n$ are carried out in parallel.

Figure 5:
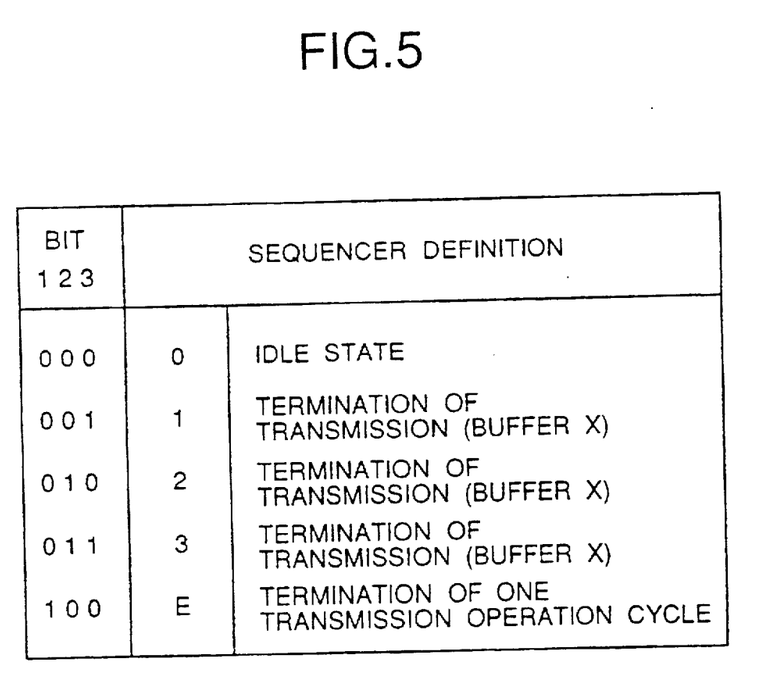
FIG. 5 is a diagram illustrating definitions of operation states of a master control sequencer (MCS) provided in the adapter.

The MCS 42 defines operation states, each of which are identified by 3 bits in the example shown in FIG. 5. FIG. 5 shows the operation states defined by the MCS 42 in the adapter 11 having four BCSs $41_0$–$41_3$ (n=3).

Referring to FIG. 5, a state "0" identified by 3 bits (000) is an idle state where there is no operation in the hardware.

A state "1" identified by 3 bits (001) is a state where one of the BCSs $41_0$–$41_3$ has terminated the data transmission operation.

A state "2" identified by 3 bits (010) is a state where another one of the BCSs has terminated the data transmission operation after one BCS has already terminated its operation.

A state "3" identified by 3 bits (011) is a state where another one of the BCSs has terminated the data transmission operation after two BCSs have already terminated their operation.

A state "E" identified by 3 bits (100) is a state where the last BCS has terminated the data transmission operation and data stored in all the buffers $32_0$–$32_3$ has been completely transmitted to the CPU 10.

Figure 6:
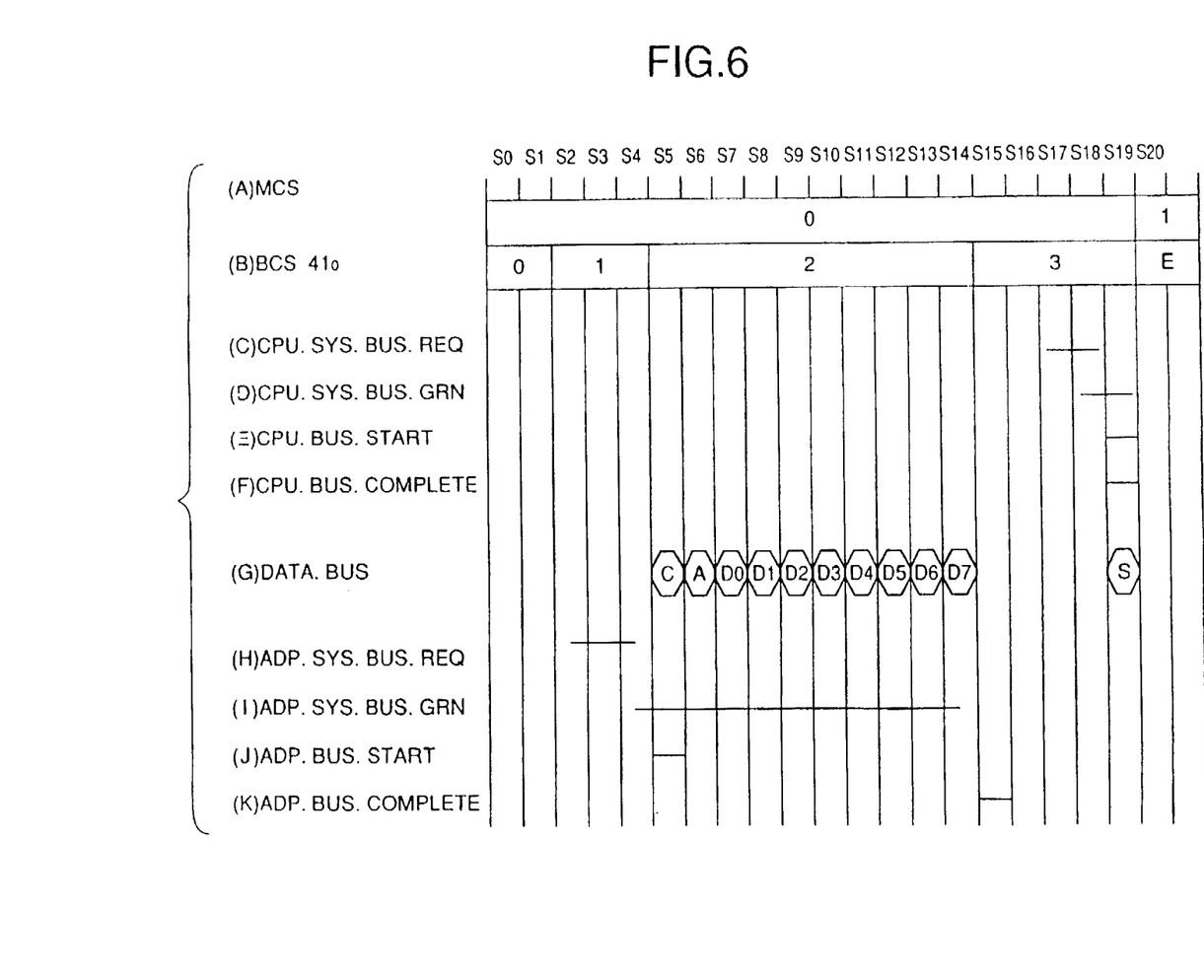
FIG. 6 is a timing chart illustrating an operation of the data transmission system.

The data transmission operation in one ($41_0$) of the BCSs $41_0$–$41_3$ is performed as shown in FIG. 6.

In steps S0–S19 of system clocks, the MCS 42 is in the idle state "0" as shown in (A) of FIG. 6. The BCS $41_0$ is in the idle state "0" in steps S0 and S1 as shown in (B) of FIG. 6. In step S0, other BCSs $41_2$–$41_3$ are also in the idle state "0". When the buffer $32_0$ corresponding to the BCS $41_0$ is filled with the data in step S1, the control logic circuit 43 transmits a system bus request signal (ADP.SYS.BUS.REQ), as shown in (H) of FIG. 6, and the state of the BCS $41_0$ is changed to the permission waiting state "1". After this, the control logic circuit 43 receives a system bus grant signal (ADP.SYS.BUS.GRN) in step S4 as shown in (I) of FIG. 6. In the next step S5, the BCS$41_0$ is in the state "2" where the data is being transmitted, and the control logic circuit 43 transmits a system bus use start signal (ADP.BUS.STAR) to the CPU 10 as shown in (J) of FIG. 6. In this step S5, the control logic circuit 43 forwards a command C for informing the CPU 10 of the DMA transmission to the data bus in the system bus 12 via the selector 33 and the latch circuit 34, as shown in (G) of FIG. 6. In step S6, the control logic circuit 43 forwards an address A indicating the location to which the data is to be transmitted to the system bus 12 via the selector 33 and the latch circuit 34.

After this, the control logic circuit 43 makes the selector 33 select the buffer $32_0$, and the BCS $41_0$ controls the buffer $32_0$ so that the data D0–D7 stored in the buffer $32_0$ is forwarded to the system bus via the selector 33 and the latch circuit 34 in steps S7–S14 as shown in (G) of FIG. 6. In addition, in step S15, the control logic circuit 43 transmits a system bus complete signal (ADP.BUS.COMPLETE), indicating that the data transmission is completed, to the CPU 10 as shown in (K) of FIG. 6. Thus, in the next step S16, the BCS $41_0$ is waiting to receive the transmission result (a response) from the CPU 10 in the state "3".

On the other hand, after the CPU 10 normally receives the data from the adapter 11, the CPU 10 transmits a system bus request signal (CPU.SYS.BUS.REQ) to the adapter 11 in step S17 as shown in (C) of FIG. 6. When the CPU 10 obtains a system bus grant signal (CPU.SYS.BUS.GRN) in step S18 as shown in (D) of FIG. 6, the CPU transmits the system bus use start signal (CPU.BUS.START) to the adapter 11 in the next step S19 as shown in (E) of FIG. 6. The CPU 10 then transmits a response signal S to the adapter 11 in response to the receiving of the data via the system bus 12 as shown in (G) of FIG. 6. A system bus complete signal (CPU.BUS.COMPLETE) is then transmitted from the CPU 10 to the adapter 11 as shown in (F) of FIG. 6.

In the next step S20, the state of the MCS 42 is changed to the state "1" where the BCS $41_0$ has terminated the data transmission operation as shown in (A) of FIG. 6, and the state of the BCS $41_0$ is changed to the state "E" where the transmission operation is completed as shown in (B) of FIG. 6.

Figure 7:
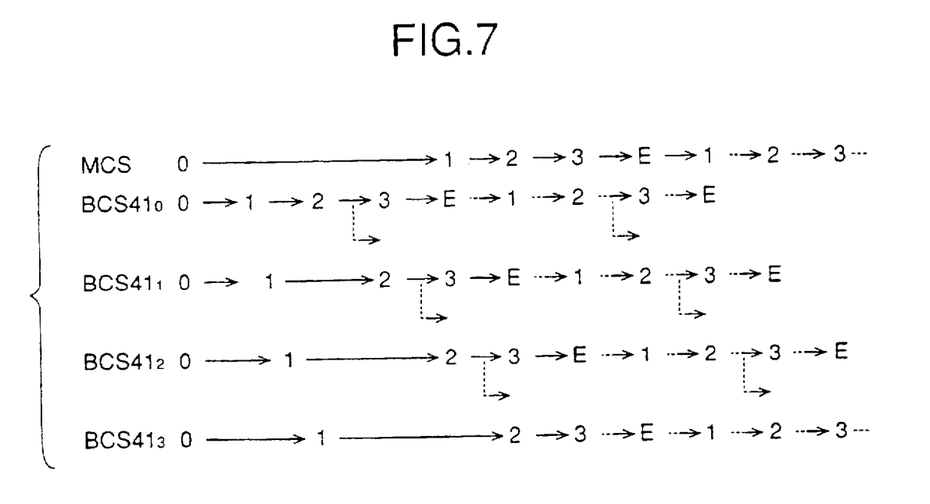
FIG. 7 and FIG. 8 are timing charts illustrating examples of operation state transitions of the master control sequencer (MCS) and buffer control sequencers (BCS $41_0$–$41_3$).

In a normal data transmission operation, the states of the BCSs $41_0$–$41_3$ and the MCS 42 are changed as shown in FIG. 7.

The DMAC 22 is activated, so that the data read out from the device is transmitted from the DBF 23 to the SBC 21 and the buffers $32_0$–$32_3$ are filled with the data. At this time, as shown in FIG. 7, the idle state "0" of the BCSs $41_0$–$41_3$ is changed to the permission waiting state "1". After this, the BCS $41_0$, for example, requests the permission for the data transmission. When the BCS 41 obtains permission for the data transmission, the BCS $41_0$ is in the state "2", in which the data is being transmitted. In this state "2", the data stored in the buffer $32_0$ is transmitted from the adapter 11 to the CPU 10. When the data transmission is completed, the state "2" of the BCS $41_0$ is changed to the state "3", in which the adapter 11 is waiting the transmission result from the CPU 10.

When the state of the BCS $41_0$ is changed to the state "3", the system bus 12 is released from the adapter 11. In this state, the BCS $41_1$ other than the BCS $41_0$, for example, requests permission for the data transmission. If the BCS $41_1$ obtains the permission to transmit the data, the state of the BCS $41_1$ is changed to the state "2" so that the data stored in the buffer $32_1$ is transmitted from the adapter 11 to the CPU 10. If the BCS $41_0$ which is in the state "3" receives the transmission result indicating the data has been normally received by the CPU 10, the state of the BCS $41_0$ is changed to the state "E".

Every time the state of any one of the BCSs $41_0$–$41_3$ is changed from the state "2" to the state "3" so that the system bus 12 is released from the adapter 11, the state of another BCS which has obtained the permission to transmit the data is changed to the state "2", and the data stored in the buffer, corresponding to the BCS whose state has been changed to the state "2" is then transmitted from the adapter 11 to the CPU 10. If there is remaining data to be transmitted to the CPU 10, every time one of the buffers $32_0$–$32_3$ becomes empty, the data is supplied from the DBF 23 to each of the buffers $32_0$–$32_3$ and is stored therein. Every time any one of the buffers $32_0$–$32_3$ is filled with the data, the state of a corresponding BCS among the BCSs $41_0$–$41_3$ is changed from the state "E to the state "1" so that the corresponding BCS requests permission to transmit the data.

The state of the MCS 42 makes a single transition, in the sequence of transitions from state "1" to state "2" to the state "3", every time the state of one of the BCSs $41_0$–$41_3$ is changed to the state "E". When the state of the last one of the BCSs $41_0$–$41_3$ is changed to the state "E", the state of the MCS 42 is changed to the state "E" and a cycle of the data transmission operation is completed. When the state of one of the BCSs $41_0$–$41_3$ is changed to the state "E" in the next cycle of the transmission operation, the state of the MCS 42 is changed from the state "E" to the state "1".

As has been described above, the data to be transmitted to the CPU 10 is first stored in a plurality of buffers $32_0$–$32_n$, and the BCSs $41_0$–$41_n$ then control the plurality of buffers $32_0$–$32_n$ so that when transmission of the data from one of the buffers $32_0$–$32_n$ is completed, before it is confirmed, by a response from the CPU 10, that the result of the transmission of the data is complete, transmission of the data from the next one of the plurality of buffers $32_0$–$32_n$ starts. Thus, the data can be transmitted from the buffer 11 to the CPU with a high transmission rate.

Figure 8:
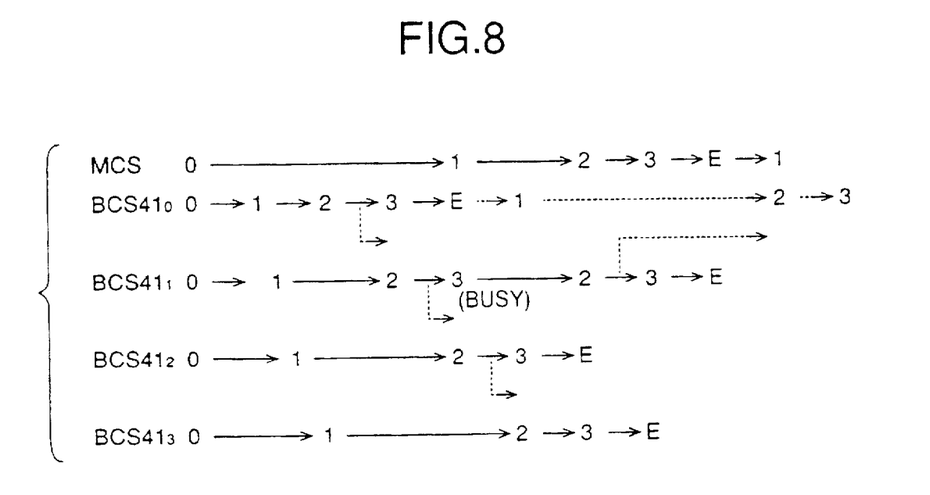

FIG. 8 shows states of the BCSs $41_0$–$41_3$ and the MCS 42 in the data transmission operation with a retry operation.

Referring to FIG. 8, the BCS $41_1$ which is in the state "2" controls the buffer $32_1$ so the data stored in the buffer $32_1$ is transmitted from the adapter 11 to the CPU 10, and when the transmission of the data is completed, the state of the BCS $41_1$ is changed to the state "3". If, at this time, the CPU 10 is in the busy state so that the data is not received by the CPU 10, the BCS $41_1$ is informed that the CPU 10 is in the busy state. When the BCS $41_1$ recognizes that the CPU 10 is in the busy state, the use of the system bus 12 is granted to the other BCS 412. Thus, the BCS $41_1$ is waiting until the use of the system bus 12 is granted thereto. While the BCS $41_1$ is waiting, if the BCSs $41_2$ and $41_3$ obtain permission to transmit the data, the data is successively supplied from the buffers $32_2$ and $32_3$ to the CPU 10. After this, when the use of the system bus 12 is granted to the BCS $41_1$, the data stored in the buffer $32_1$ is retransmitted from the adapter 11 to the CPU 10 (the retry operation).

In this case, even if the data transmission operation controlled by the BCS $41_3$ is completed, the MCS 42 is in the state "3". Thus, the BCS $41_0$ is waiting to transmit the next data. After this, when the retry-operation of the BCS $41_1$ is completed, the state of the MCS 42 is changed to the state "E". Then, the next data transmission cycle starts, so that the BCS $41_0$ obtains permission to transmit the data.

According to the above control of the data transmission operation, even if the busy state occurs in the data transmission operation of the BCS $41_1$, the data transmission operations of the BCSs $41_2$ and $41_3$ are not interrupted. Thus, the system bus 12 can be efficiently used, so that the efficient data transmission operation can be performed.

The present invention is not limited to the aforementioned embodiments, and variations and modifications may be made without departing from the scope of the claimed invention.

What is claimed is:

1. A data transmission system in a computer system including at least one processing unit for processing data, at least one adapter for controlling a device coupled thereto, and a system bus to which each said processing unit and each said adapter is coupled, in which each said processing unit and each said adapter selectively acquires use of said bus for forwarding information over said bus and wherein, after information is forwarded to said bus by each said processing unit or each said adapter which has acquired use of said bus, said bus is released therefrom, said data transmission system comprising:

a plurality of buffers, provided in said adapter, for storing data to be transmitted to said processing unit;

a plurality of buffer control means respectively coupled to said plurality of buffers, each of said buffer control means being operative for controlling transmission, over the system bus, of data stored in the respective buffer when use of said bus is granted to the respective buffer control means in response to a request for permission to transmit data over the acquired system bus; and each of said plurality of buffer control means further comprising;

state indication means for indicating a data transmission state of a corresponding one of said plurality of buffers, and master control means for supervising the state indication means of each of said plurality of buffer control means so that until the data stored in all of said plurality of buffers is completely transmitted to said processing unit, each of said plurality of buffer control means is prohibited from starting the transmission of data in a next cycle in which new data stored in said plurality of buffers is to be transmitted, said state indication means indicating one of:

a first state indicating that there is no operation;

a second state indicating waiting permission to transmit the data;

a third state indicating that the data is being transmitted; and a fourth state indicating that the transmission of the data is completed.

2. The transmission system as claimed in claim 1, wherein each said adapter of said transmission system further comprises coupling means for coupling, to said bus, a buffer corresponding to buffer control means to which the use of said bus is granted.

3. The transmission system as claimed in claim 2, wherein said coupling means further comprises a selector for selecting one of said plurality of buffers in accordance with information indicating which buffer control means has been granted the use of said bus, so that one of said plurality of buffers selected by said selector is coupled to said bus.

4. A data transmission system comprising at least one processing unit for processing data and issuing instructions;

at least one adapter, responsive to instructions issued by a corresponding processing unit, for controlling a respective device coupled thereto in accordance with an instruction received thereby from the corresponding processing unit;

a system bus coupling each processing unit to each device, said system bus being selectively acquired by each said processing unit and each said adapter for transferring information therefrom to the bus and the bus being released from such selective acquisition after completion of the information transfer;

each said adapter comprising:

plurality of buffers, each buffer operable for storing data to be transmitted to a selected said processing unit over the system bus, a plurality of buffer controllers respectively coupled to said plurality of buffers, and a control logic circuit, responsive to the current state of the buffer controllers, for transmitting a request to acquire use of the system bus and, upon acquiring such use, controlling the buffer controllers in accordance with the respective states thereof to transmit data from the respective buffer when use of the system bus is granted to the respective buffer controller; and each of said plurality of buffer controllers further comprising:

a state indicator for indicating a data transmission state of a corresponding one of said plurality of buffers, and a master controller for supervising the state indicator of each of said plurality of buffer controllers so that until the data stored in all of said plurality of buffers is completely transmitted to said processing unit, each of said plurality of buffer control means is prohibited from starting the transmission of data in a next cycle in which new data stored in said plurality of buffers is to be transmitted, said state indicator indicating one of:

a first state indicating that there is no operation;

a second state indicating waiting permission to transmit the data;

a third state indicating that the data is being transmitted; and a fourth state indicating that the transmission of the data is completed.

* * * * *

UNITED STATES PATENT AND TRADEMARK OFFICE
CERTIFICATE OF CORRECTION

PATENT NO. : 5,797,040
DATED : August 18, 1998
INVENTOR(S) : Yoichi NAKAMURA

It is certified that error appears in the above-identified patent and that said Letters Patent is hereby corrected as shown below:

On the Title Page, [73] Assignee:, change "Kanagawa" to --Kawasaki--.

Col. 4,    line 19, after "states" insert --,--.

Col. 5,    line 38, after "S17" insert --,--.

Col. 6,    line 17, after " "3" " insert --,--.
           line 27, delete "the" first occurrence.

Signed and Sealed this

Twentieth Day of July, 1999

Attest:

Attesting Officer

Q. TODD DICKINSON

Acting Commissioner of Patents and Trademarks